(12) United States Patent
Nogi et al.

(10) Patent No.: US 12,370,627 B2
(45) Date of Patent: Jul. 29, 2025

(54) LASER MACHINING APPARATUS, LASER MACHINING METHOD, AND PROCESSING PROGRAM CREATION DEVICE

(71) Applicant: AMADA CO., LTD., Kanagawa (JP)

(72) Inventors: Kazuhisa Nogi, Kanagawa (JP); Noboru Kikkawa, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 956 days.

(21) Appl. No.: 17/429,340

(22) PCT Filed: Feb. 7, 2020

(86) PCT No.: PCT/JP2020/004809
§ 371 (c)(1),
(2) Date: Aug. 8, 2021

(87) PCT Pub. No.: WO2020/170856
PCT Pub. Date: Aug. 27, 2020

(65) Prior Publication Data
US 2022/0143749 A1 May 12, 2022

(30) Foreign Application Priority Data
Feb. 18, 2019 (JP) ................................. 2019-026324

(51) Int. Cl.
*B23K 26/10* (2006.01)
*B23K 26/38* (2014.01)

(52) U.S. Cl.
CPC .............. *B23K 26/10* (2013.01); *B23K 26/38* (2013.01)

(58) Field of Classification Search
CPC ................................ B23K 26/38; B23K 26/10

USPC ..................................................... 219/121.67
See application file for complete search history.

(56) References Cited

U.S. PATENT DOCUMENTS

| 4,328,411 A | * | 5/1982 | Haller | ................. H02K 15/026 225/2 |
| 4,613,269 A | * | 9/1986 | Wilder | ...................... G06T 7/11 414/730 |
| 4,618,938 A | * | 10/1986 | Sandland | ................ G06T 7/001 382/148 |

(Continued)

FOREIGN PATENT DOCUMENTS

| EP | 1647349 A1 * | 4/2006 | ............ B23K 26/04 |
| JP | S60-80086 U | 6/1985 | |

(Continued)

OTHER PUBLICATIONS

Extended European Search Report for corresponding EP Application No. 20759781.6 dated Mar. 14, 2022.

(Continued)

*Primary Examiner* — Jimmy Chou
(74) *Attorney, Agent, or Firm* — Renner, Otto, Boisselle & Sklar, LLP

(57) ABSTRACT

The laser machining apparatus of the present invention is configured to analyze and adjust a cutting order of opening forming regions in order to prevent a scrap rising from interfering with a laser head by determining a first opening forming region and a second opening forming region based on interfering conditions of the scrap rising with the laser head and processing the second opening forming region prior to the processing of the first opening forming region.

7 Claims, 8 Drawing Sheets

(56) References Cited

U.S. PATENT DOCUMENTS

| | | | | |
|---|---|---|---|---|
| 4,667,113 A | * | 5/1987 | Nakajima | G06T 7/0006 250/559.08 |
| 4,794,222 A | * | 12/1988 | Funayama | B23K 26/048 219/121.79 |
| 5,387,061 A | * | 2/1995 | Barkman | B23Q 17/24 409/80 |
| 5,489,758 A | * | 2/1996 | Nihei | B23K 26/0884 901/42 |
| 5,624,588 A | * | 4/1997 | Terawaki | B23K 9/1272 901/42 |
| 5,751,584 A | * | 5/1998 | Yuasa | G05B 19/4068 700/174 |
| 5,864,114 A | * | 1/1999 | Fukuda | B23K 26/032 219/121.69 |
| 6,008,465 A | * | 12/1999 | Horn | B23K 26/123 219/121.72 |
| 6,084,223 A | * | 7/2000 | Dietz | B23K 26/032 219/121.64 |
| 6,128,546 A | * | 10/2000 | Basista | G05B 19/4205 700/173 |
| 6,353,203 B1 | * | 3/2002 | Hokodate | B23K 26/032 219/121.75 |
| 6,430,472 B1 | * | 8/2002 | Boillot | G05B 19/056 901/41 |
| 6,563,130 B2 | * | 5/2003 | Dworkowski | G01S 17/46 702/158 |
| 6,603,136 B1 | * | 8/2003 | Wagner | B23K 26/04 250/221 |
| 6,617,541 B1 | * | 9/2003 | Wadman | H05K 3/027 349/139 |
| 6,632,053 B2 | * | 10/2003 | Koch | G05B 19/4099 700/193 |
| 6,710,294 B2 | * | 3/2004 | Lawson | B23K 26/142 219/121.84 |
| 6,974,930 B2 | * | 12/2005 | Jense | B23K 26/082 359/201.1 |
| 7,005,606 B2 | * | 2/2006 | Legge | B23K 26/04 219/121.82 |
| 7,038,165 B2 | * | 5/2006 | Okuda | B23K 26/0884 219/121.78 |
| 7,062,351 B2 | * | 6/2006 | Wampler | G05B 19/4069 700/178 |
| 7,283,892 B1 | * | 10/2007 | Boillot | G01S 17/46 901/41 |
| 7,638,731 B2 | * | 12/2009 | Kosmowski | B23K 26/043 219/121.68 |
| 7,764,039 B2 | * | 7/2010 | Yamaguchi | G05B 19/4061 318/560 |
| 8,175,858 B2 | * | 5/2012 | Naganawa | G05B 19/4069 703/7 |
| 8,367,969 B2 | * | 2/2013 | Caristan | B23K 26/38 219/121.72 |
| 8,581,144 B2 | * | 11/2013 | Furuta | B23K 26/046 219/121.75 |
| 8,624,153 B2 | * | 1/2014 | Atsumi | B23K 26/53 219/121.72 |
| 8,987,634 B2 | * | 3/2015 | Pieger | B23K 31/12 219/121.84 |
| 9,110,459 B2 | * | 8/2015 | Matsumoto | B23Q 39/027 |
| 9,122,267 B2 | * | 9/2015 | Morita | G06T 7/564 |
| 10,507,558 B2 | * | 12/2019 | Inaba | B23Q 17/2404 |
| 11,396,057 B2 | * | 7/2022 | Boillot | G01S 17/86 |
| 11,583,951 B2 | * | 2/2023 | Fahrni | B23K 26/08 |
| 2003/0192865 A1 | * | 10/2003 | Cole, III | B23K 26/211 700/166 |
| 2003/0209528 A1 | * | 11/2003 | Choo | B28D 5/00 219/121.72 |
| 2004/0206735 A1 | * | 10/2004 | Okuda | B23K 26/04 219/121.78 |
| 2005/0010324 A1 | * | 1/2005 | Kaever | G05B 19/4061 700/178 |
| 2005/0226377 A1 | * | 10/2005 | Wong | G05B 19/4061 378/65 |
| 2006/0081575 A1 | * | 4/2006 | Egawa | B23K 26/382 219/121.84 |
| 2007/0075054 A1 | * | 4/2007 | Nakamura | B23K 26/04 219/121.61 |
| 2007/0084837 A1 | * | 4/2007 | Kosmowski | B23K 26/043 219/121.68 |
| 2007/0228025 A1 | * | 10/2007 | Horn | B23K 26/1476 219/121.84 |
| 2009/0127762 A1 | * | 5/2009 | Kilian | B23K 37/0408 269/296 |
| 2010/0133243 A1 | * | 6/2010 | Nomaru | B23K 26/032 219/121.67 |
| 2010/0176099 A1 | * | 7/2010 | Hilderbrand | G05B 19/401 340/686.1 |
| 2011/0089956 A1 | * | 4/2011 | Hermann | B23K 26/03 324/686 |
| 2011/0100967 A1 | * | 5/2011 | Yoo | G01N 27/00 219/121.73 |
| 2011/0210109 A1 | * | 9/2011 | Szelagowski | B23K 26/38 219/121.72 |
| 2011/0278268 A1 | * | 11/2011 | Siman-Tov | B41C 1/02 219/121.69 |
| 2011/0313561 A1 | * | 12/2011 | Lee | G06T 7/0004 700/166 |
| 2012/0111839 A1 | * | 5/2012 | Grassi | B23K 26/0884 219/121.81 |
| 2012/0267349 A1 | * | 10/2012 | Berndl | B23K 26/046 219/121.65 |
| 2013/0200052 A1 | * | 8/2013 | Wittwer | B23K 26/1462 219/121.75 |
| 2013/0256285 A1 | * | 10/2013 | Baxter | B23K 26/048 219/121.72 |
| 2014/0103019 A1 | * | 4/2014 | Galvagnini | B23K 26/702 219/121.85 |
| 2014/0116997 A1 | * | 5/2014 | Inoue | B23K 26/38 219/121.67 |
| 2014/0138363 A1 | * | 5/2014 | Hammann | B23K 26/04 219/121.78 |
| 2014/0263211 A1 | * | 9/2014 | Hassan | B23K 26/361 219/121.81 |
| 2015/0028007 A1 | * | 1/2015 | Pluss | B23K 26/40 219/121.68 |
| 2015/0151381 A1 | * | 6/2015 | Kurosawa | B23K 26/1464 219/121.83 |
| 2015/0241868 A1 | * | 8/2015 | Matsumoto | B23K 26/0892 700/114 |
| 2015/0266133 A1 | * | 9/2015 | Tokito | B23K 26/083 219/121.6 |
| 2015/0273626 A1 | * | 10/2015 | Tokito | B23K 26/043 219/121.6 |
| 2015/0352679 A1 | * | 12/2015 | Yamamoto | B23Q 17/00 73/865.8 |
| 2016/0059347 A1 | * | 3/2016 | Kogel-Hollacher | B23K 26/082 219/121.73 |
| 2016/0059350 A1 | * | 3/2016 | Schoenleber | B23K 26/04 219/121.81 |
| 2016/0059351 A1 | * | 3/2016 | Miyashita | B23K 26/048 219/121.81 |
| 2016/0096239 A1 | * | 4/2016 | Raichle | B23K 26/1436 219/74 |
| 2016/0114434 A1 | * | 4/2016 | Regaard | B23K 26/046 219/121.81 |
| 2016/0158884 A1 | * | 6/2016 | Hagenlocher | B23K 26/042 219/121.85 |
| 2016/0184923 A1 | * | 6/2016 | Tokito | B23K 26/048 219/121.81 |
| 2016/0193692 A1 | * | 7/2016 | Regaard | B23K 31/125 219/121.62 |
| 2017/0157702 A1 | * | 6/2017 | Takada | B23K 26/03 |
| 2017/0232558 A1 | * | 8/2017 | Kano | B23K 26/382 219/121.72 |
| 2017/0236738 A1 | * | 8/2017 | Van Lieshout | B23K 26/364 425/174 |

(56) References Cited

U.S. PATENT DOCUMENTS

| | | | |
|---|---|---|---|
| 2017/0334019 A1* | 11/2017 | Izumi | B23K 26/032 |
| 2018/0076060 A1* | 3/2018 | Oh | H01L 21/68757 |
| 2018/0277435 A1* | 9/2018 | Fujita | B23K 26/53 |
| 2018/0370058 A1* | 12/2018 | Fukada | B26D 7/1863 |
| 2019/0128857 A1* | 5/2019 | Hiramatsu | G01N 30/24 |
| 2019/0247960 A1* | 8/2019 | Mienhardt | B23K 26/032 |
| 2020/0041249 A1* | 2/2020 | Strebel | B23K 26/032 |
| 2020/0047274 A1* | 2/2020 | Tani | B23K 26/032 |
| 2021/0308799 A1* | 10/2021 | Funaoka | B23K 26/1464 |
| 2021/0402521 A1* | 12/2021 | Lin | B23K 26/361 |
| 2022/0314370 A1* | 10/2022 | Mach | B23K 26/70 |
| 2023/0054278 A1* | 2/2023 | Sepp | B23K 31/10 |

FOREIGN PATENT DOCUMENTS

| | | | |
|---|---|---|---|
| JP | 4-361885 A | 12/1992 | |
| JP | 2016-78063 A | 5/2016 | |
| WO | WO-2015104071 A1 * | 7/2015 | B23K 26/0884 |

OTHER PUBLICATIONS

International Search Report for corresponding Application No. PCT/JP2020/004809, mailed Apr. 7, 2020.
Written Opinion for corresponding Application No. PCT/JP2020/004809, mailed Apr. 7, 2020.
Office Action for corresponding Japanese Application No. 2019-026324, dated Mar. 31, 2020.

* cited by examiner (a)

(b)

LASER MACHINING APPARATUS, LASER MACHINING METHOD, AND PROCESSING PROGRAM CREATION DEVICE

TECHNICAL FIELD

The present invention relates to a laser machining apparatus, a laser machining method, and a processing program creation device.

BACKGROUND ART

A laser machining apparatus irradiates, with a laser beam, a sheet metal mounted on a table, on which skids are arranged, to cut the sheet metal, and cuts out parts having a predetermined shape. For a part in which an opening is formed, the laser machining apparatus cuts around an opening forming region where the opening is formed, and then cuts around the part. A portion to be cut and removed from the part is referred to as a scrap. The part is retained on the table, and the scrap drops down through a space between the skids (see Patent Literature 1).

Depending on a blank layout position, the opening forming region might be located on the skid, and in such a case, depending on conditions such as a shape or size of the opening forming region and a skid spacing, the scrap might not drop down through the space between the skids, and the cut scrap might remain and rise on the skids.

CITATION LIST

Patent Literature

Patent Literature 1: Japanese Patent Application Laid-Open Publication No. 2016-78063

SUMMARY

In a conventional laser machining apparatus, in a case where a cut scrap remains and rises on skids, a laser head emitting a laser beam might interfere with the scrap rising when a proximal hole is subsequently processed. There is concern that the laser head is damaged in a case where the laser head interferes with the scrap rising.

For this reason, a processing order has conventionally been set manually by an operator so that the scrap rising does not interfere.

However, there is a problem that an only skilled operator can set the processing order so that the scrap rising does not interfere.

An object of the present invention is to provide a laser machining apparatus, a laser machining method, and a processing program creation device that can prevent a scrap rising from interfering with a laser head without manually setting a processing order.

The present invention provides a laser machining apparatus including a machining apparatus main body including a table on which a plurality of skids are arranged, and configured to irradiate a material mounted on the skids with a laser beam from a laser head and cut the material, and a control device configured to control the machining apparatus main body to cut around an opening forming region set in the material and form an opening, wherein the control device determines that the opening forming region where a scrap rising after processing is to be formed in a plurality of scraps formed by cutting around the opening forming region is a first opening forming region, determines, in a case where the first opening forming region is processed and the scrap rises, that the opening forming region where the laser head is moved to a position at which the laser head interferes with the scrap rising is a second opening forming region, and controls the machining apparatus main body to perform processing in such a processing order that the second opening forming region is processed prior to the processing of the first opening forming region.

The present invention provides a laser machining method in a laser machining apparatus including a table on which a plurality of skids are arranged, and configured to irradiate a material mounted on the skids with a laser beam from a laser head and cut the material, the laser machining method including determining that an opening forming region where a scrap rising after processing is to be formed in a plurality of scraps formed by cutting around the opening forming region set in the material is a first opening forming region, determining, in a case where the first opening forming region is processed and the scrap rises, that the opening forming region where the laser head is moved to a position at which the laser head interferes with the scrap rising is a second opening forming region, and adopting such a processing order that the second opening forming region is processed prior to the processing of the first opening forming region.

The present invention provides a processing program creation device for creating a processing program including, in a case where a laser machining apparatus cuts around an opening forming region set in a material mounted on a table on which a plurality of skids are arranged to form an opening, determining that the opening forming region where a scrap rising after processing is to be formed in a plurality of scraps formed by cutting around the opening forming region is a first opening forming region, determining, in a case where the laser machining apparatus processes the first opening forming region and the scrap rises, that the opening forming region where a laser head of the laser machining apparatus is moved to a position at which the laser head interferes with the scrap rising is a second opening forming region, and adopting such a processing order that the second opening forming region is processed prior to the processing of the first opening forming region.

DESCRIPTION OF EMBODIMENT

Hereinafter, description will be made as to a laser machining apparatus and a laser machining method according to an embodiment with reference to the accompanying drawings.

Figure 1:
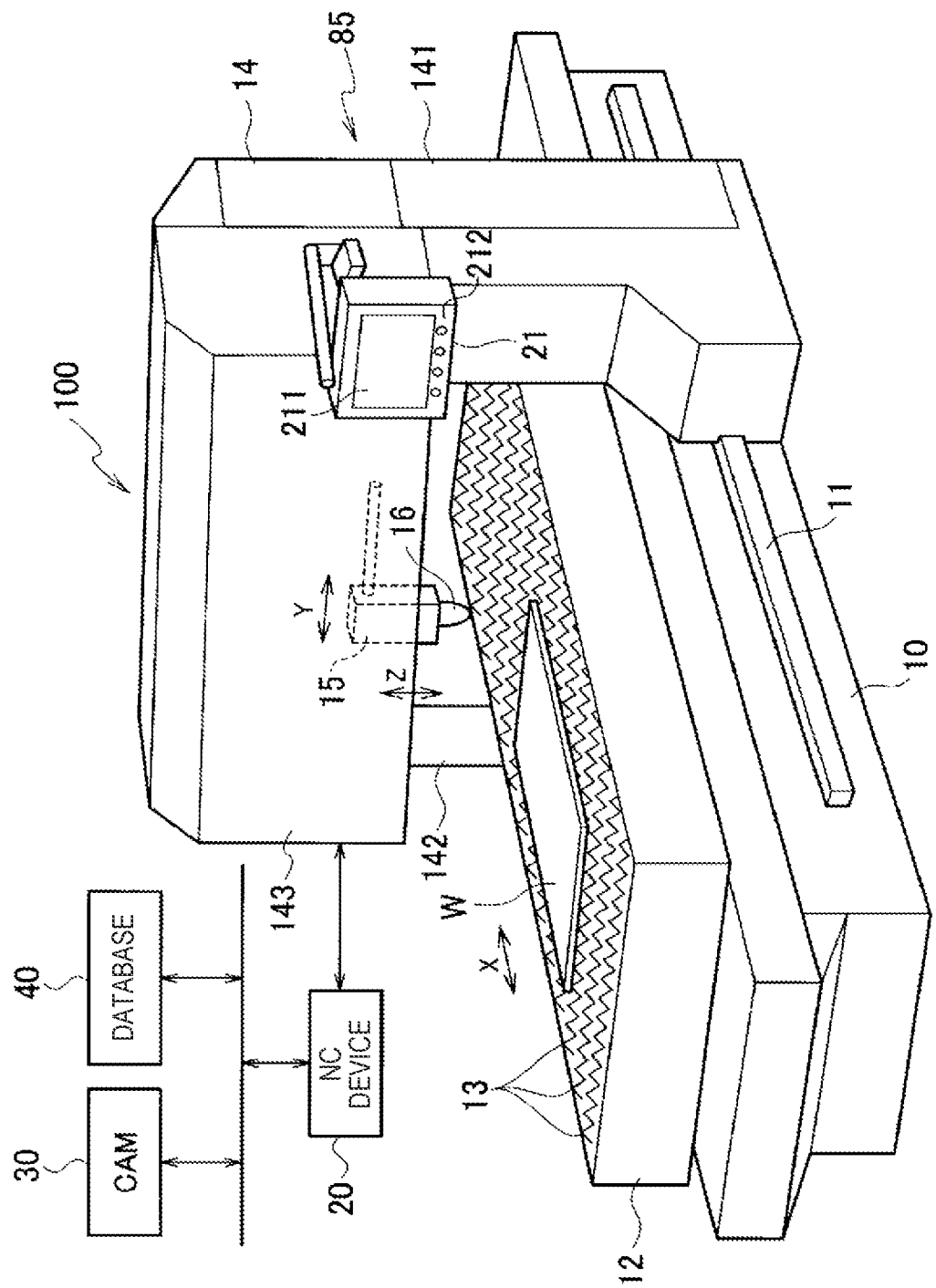
FIG. 1 is a view showing an example of an entire configuration of a laser machining apparatus according to an embodiment.

First, an example of an entire configuration of a laser machining apparatus 100 according to an embodiment will be described with reference to FIG. 1. In FIG. 1, a table 12 on which a sheet metal W is mounted as a material of a processing object is provided on a base 10. In the table 12, a plurality of rows of skids 13 each constituted of, for example, an iron plate are arranged in an X-direction. A plurality of triangular protrusions are formed and arranged in an upper end portion of each skid 13. Therefore, the sheet metal W is supported by the plurality of protrusions.

The laser machining apparatus 100 includes a gate-type frame 14 disposed to straddle the table 12. The frame 14 includes side frames 141 and 142 and an upper frame 143. The frame 14 is configured to move, in the X-direction, along a rail 11 in the X-direction that is formed on a side surface of the base 10.

In the upper frame 143, a carriage 15 movable in a Y-direction is provided. A laser head 16 that emits a laser beam is attached to the carriage 15. The frame 14 moves in the X-direction, the carriage 15 moves in the Y-direction, and thereby, the laser head 16 is configured to arbitrarily move in the X and Y-directions above the sheet metal W. The laser head 16 is movable also in a Z-direction. When the laser head 16 moves above the sheet metal W, the laser head 16 is controlled to keep a space from the sheet metal W at a predetermined distance.

The base 10, the table 12 on which the skids 13 are arranged, the frame 14 and the carriage 15 to which the laser head 16 is attached form a machining apparatus main body 85. The NC device 20 controls the machining apparatus main body 85. The NC device 20 is an example of a control device that controls the machining apparatus main body 85. The NC device 20 is formed as a part of the laser machining apparatus 100, and the NC device 20 may be external equipment of the laser machining apparatus 100.

An operation pendant 21 connected to the NC device 20 is attached to the frame 14. The operation pendant 21 includes a display unit 211 and an operation unit 212. The display unit 211 displays various types of information. An operator operates the operation unit 212 of the operation pendant 21, to supply various instruction signals to the NC device 20.

The NC device 20 is connected, via a network, to computer equipment 30 that operates computer aided manufacturing (CAM) that is software and a database 40. Hereinafter, the computer equipment 30 will be referred to as the CAM equipment 30. The CAM equipment 30 creates a processing program for controlling the laser machining apparatus 100, and supplies the program to the NC device 20 or the database 40. The NC device 20 controls the laser machining apparatus 100 based on the processing program. The database 40 stores various types of data required to create the processing program.

The laser machining apparatus 100 configured as described above irradiates the sheet metal W with the laser beam to cut the sheet metal W while moving the laser head 16 in the X-direction or the Y-direction, and cuts out one or more parts from the sheet metal W. Note that assist gas is blown to the sheet metal W in response to the irradiation with the laser beam. FIG. 1 omits illustration of a configuration of blowing the assist gas.

When the part cut out from the sheet metal W is a part in which an opening is formed, the laser machining apparatus 100 cuts around an opening forming region set in the part. When cutting around the opening forming region, the opening forming region cut off from the part forms a scrap. At this time, when the opening forming region is not located between two adjacent skids 13 and each skid 13 is located at any position from one end portion to the other end portion of the opening forming region, the scrap does not drop down, and the scrap may rise. In this case, it is necessary to avoid interference of the laser head with the scrap rising.

Figure 2:
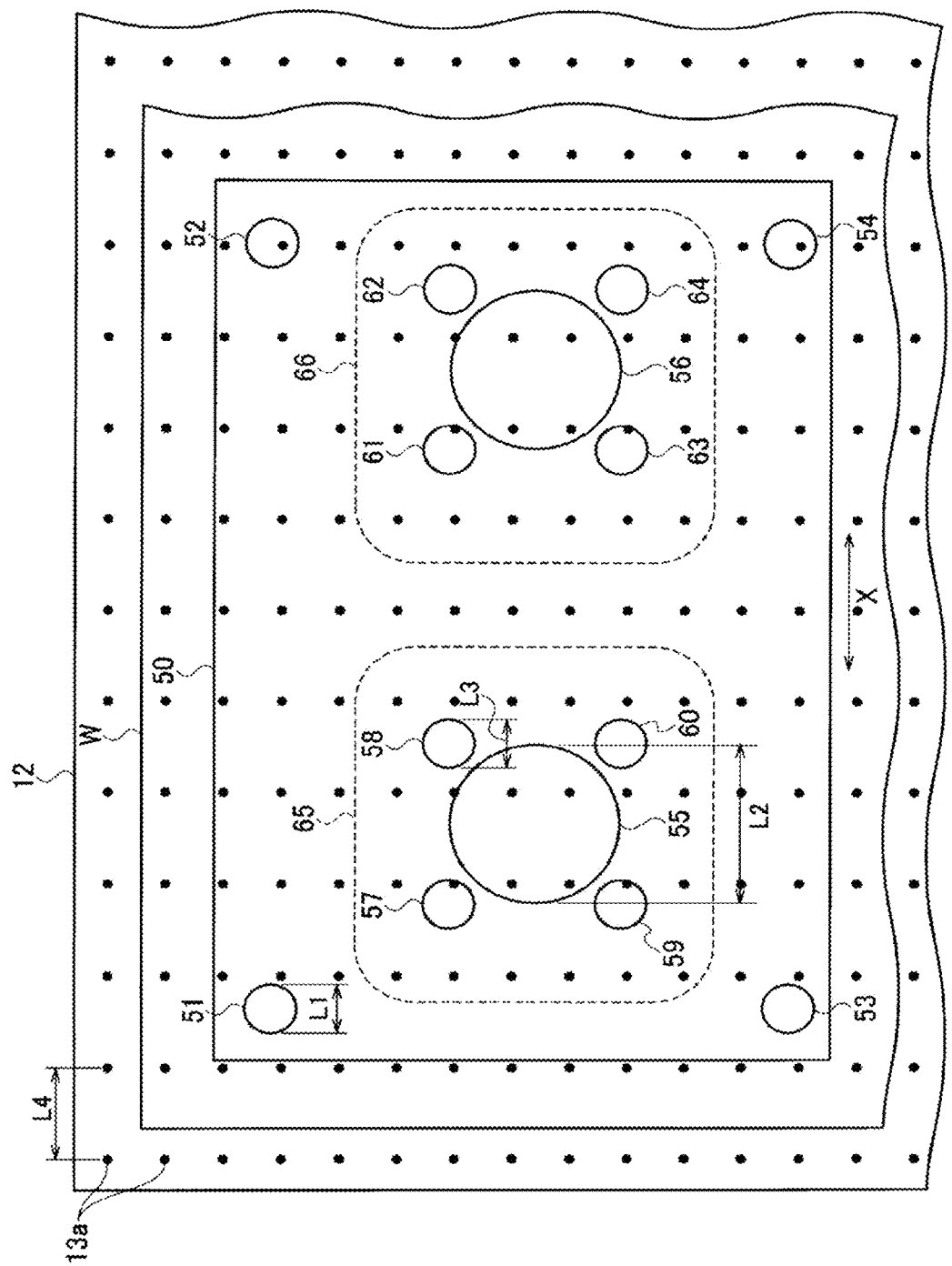
FIG. 2 is a plan view showing a first example in a case where the laser machining apparatus of the embodiment cuts out a plurality of parts from a sheet metal.
Figure 3:
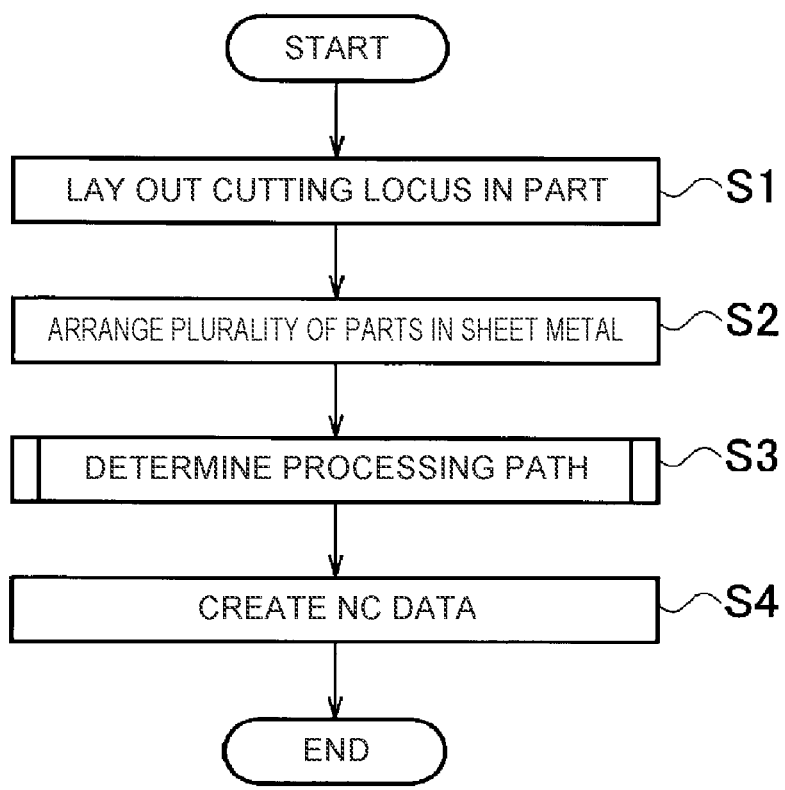
FIG. 3 is a flowchart showing outline of a processing program creation method.

With reference to FIG. 2 and FIG. 3, description will be made as to outline of a processing program creation method by the CAM equipment 30 that operates as a processing program creation device of an embodiment. A case of creating the processing program for cutting out a part 50 from the sheet metal W mounted on the table 12 as shown in FIG. 2 will be described as an example. In the part 50, opening forming regions 51 to 64 each for forming a circular opening are set.

In FIG. 2, the opening forming regions 51 to 64 include circular regions of three types of sizes. In four corners of the part 50, respectively, the opening forming regions 51 to 54 having a first diameter L1 are set, and on left and right of a central portion of the part 50, the opening forming regions 55 and 56 having a second diameter L2 are set. Four opening forming regions 57 to 60 having a third diameter L3 are set around the opening forming region 55, and four opening forming regions 61 to 64 having the third diameter L3 are set around the opening forming region 56.

In FIG. 2, the part 50 is mounted on the skids 13, and tip ends 13a of the skids 13 are displayed by points.

In FIG. 3, upon starting a process of processing program creation, the CAM equipment 30 lays out a cutting locus (a cutting path) by the laser beam in the part 50 in which the opening forming regions 51 to 64 are set in step S1. This is referred to as automatic layout. Graphic data (CAD data) of the part 50 is created by unshown CAD, and stored in the database 40. The CAM equipment 30 reads the graphic data of the part 50 from the database 40 to execute the process of automatic layout. The CAM equipment 30 may have a function of CAD that is software mounted therein. That is, the computer equipment 30 may be CAD/CAM equipment.

In step S2, the CAM equipment 30 arranges graphic data of a plurality of parts 50 in graphic data indicating the sheet metal W. This is referred to as automatic blank layout. The graphic data of the sheet metal W is stored in the database 40. The CAM equipment 30 reads the graphic data of the sheet metal W from the database 40 to execute a process of automatic blank layout. The number of the parts 50 to be arranged in the sheet metal W may be automatically set, or manually set by the operator. The number of the parts 50 to be arranged in the sheet metal W may be one.

The CAM equipment 30 determines, in step S3, a processing path for irradiating the sheet metal W with the laser beam and cutting out the part 50 from the sheet metal W. The processing path includes an outer shape and a processing order of the opening forming regions 51 to 64 in one part 50, and a processing order of a plurality of parts 50. In the present embodiment, the CAM equipment 30 determines the processing path so that the scrap rising does not interfere with the laser head, in determining the processing order of the opening forming regions 51 to 64. This processing path determination will be described later in detail.

In step S4, the CAM equipment 30 creates NC data, and ends the process of processing program creation. The NC data is a processing program including a machine control code for the NC device 20 to control the laser machining apparatus 100.

Figure 4:
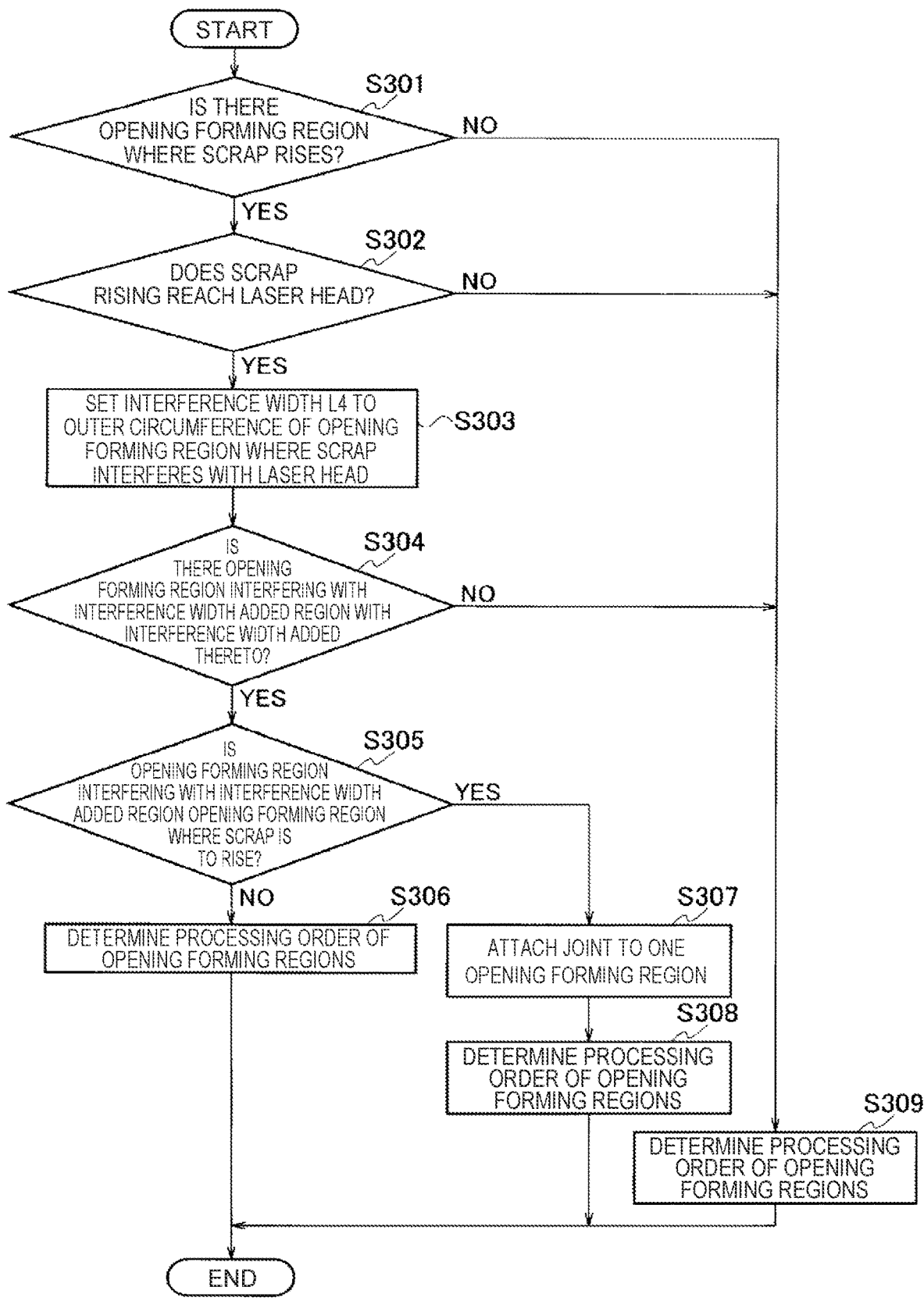
FIG. 4 is a flowchart showing detail of a process of processing path determination in step S3 of FIG. 3.

Details of a process of the processing path determination of step S3 of FIG. 3 will be described with reference to a flowchart shown in FIG. 4. The CAM equipment 30 determines, in step S301 of FIG. 4, whether or not there is an opening forming region where the scrap generated after processing is to rise in the opening forming regions 51 to 64.

The CAM equipment 30 acquires size information of the opening forming regions 51 to 64 and information of the skids 13 from the database 40. The size information of each opening forming region is length information of the opening forming region in the X-direction (a predetermined direction). Note that as shown in FIG. 2, a plurality of rows of skids 13 are arranged in the X-direction. The length information of the opening forming region in the X-direction is acquired from information of a shape or size of the opening forming region, orientation of the region mounted on the skids 13 and the like.

The size information of the opening forming region is a diameter of the region, in a case where the shape of the opening forming region is circular as shown in FIG. 2. Skid information indicates at which position each skid is disposed based on an origin position of the table 12 shown in FIG. 2, and includes interval information L4 of two adjacent rows of skids 13.

The CAM equipment 30 determines whether or not each of the opening forming regions 51 to 64 is an opening forming region having a diameter D smaller than a predetermined maximum value X1 (D<X1). It is determined that the opening forming region having the diameter smaller than the maximum value X1 is the opening forming region (a first opening forming region) where the scrap generated after the processing is to rise.

The predetermined maximum value X1 is set to a value at which the scrap generated when the opening forming region is processed does not drop down from the skids 13, and is stably mounted on the skids 13. In the opening forming regions 51 to 64 shown in FIG. 2, the predetermined maximum value X1 is set to be twice the interval L4 between the skids 13. This is set on assumption that in a case where the diameter D of the opening forming region is the maximum value X1 or more, the scrap does not drop down, and does not rise.

In a first example shown in FIG. 2, the diameter of all of the opening forming regions 51 to 64 is the second diameter L2 at maximum, and is smaller than the maximum value X1, and hence, it is determined that all of the opening forming regions 51 to 64 is the first opening forming region where the scrap is to rise.

The CAM equipment 30 determines, in step S302, whether or not each of the opening forming regions 51 to 64 is an opening forming region where the scrap rising reaches and interferes with the laser head 16.

The CAM equipment 30 determines whether or not each of the opening forming regions 51 to 64 is an opening forming region having the diameter D larger than a predetermined minimum value X2 (X2<D). It is determined that the opening forming region having the diameter larger than the minimum value X2 is an opening forming region where the scrap rising after the processing reaches and interferes with the laser head 16.

Figure 5:
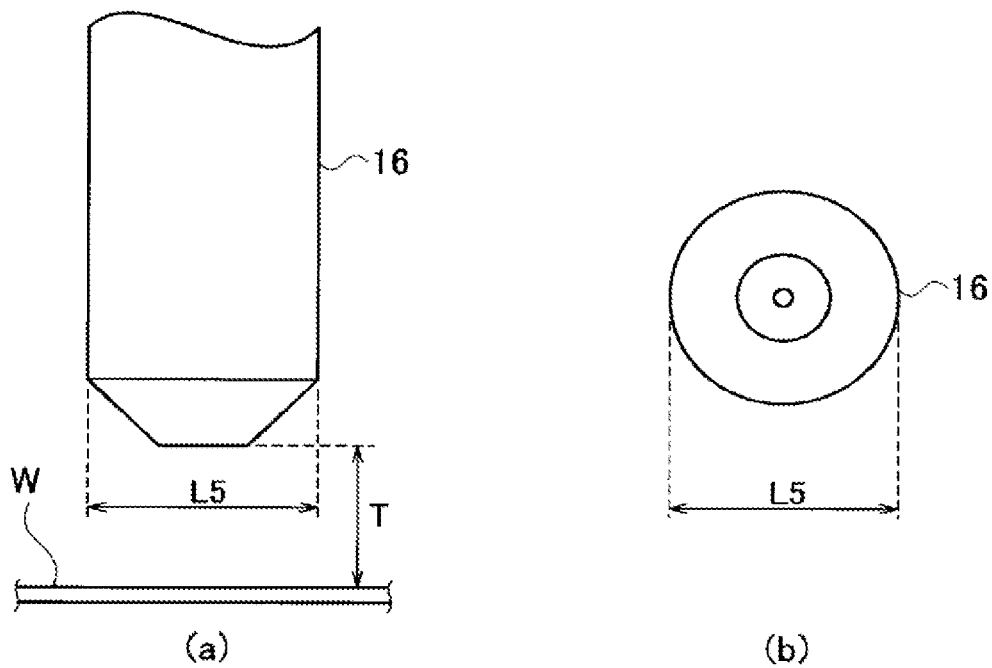
FIG. 5 is a schematic explanatory view of a laser head provided in the laser machining apparatus of the embodiment, in which (a) is a side view of the laser head, and (b) is a plan view of the laser head seen from below.

The minimum value X2 is set based on an interval between the sheet metal W and the laser head 16 (corresponding to T of FIG. 5(*a*) in the present embodiment), and is a value at which, even if the scrap rises, a tip end of the scrap rising does not reach the laser head 16 (X2=Tx2−α; α is a micro margin value). In FIG. 5, T is a distance from the sheet metal W to a tip end portion of a nozzle when the laser head 16 moves.

In the first example shown in FIG. 2, the size (the first diameter L1) of each of the opening forming regions 51 to 54 is smaller than the minimum value X2, and hence, it is determined that in the opening forming regions 51 to 54, the scrap rising does not interfere with the laser head 16. The size (the second diameter L2) of each of the opening forming regions 55 and 56 is smaller than the maximum value X1 and larger than the minimum value X2, and hence, it is determined that in the opening forming regions 55 and 56, the scrap rising interferes with the laser head 16. The size (the third diameter L3) of each of the opening forming regions 57 to 64 is smaller than the minimum value X2, and hence, it is determined that in the opening forming regions 57 to 64, the scrap rising does not interfere with the laser head 16.

In step S303, the CAM equipment 30 adds a predetermined interference width to an outer circumference of the opening forming region where it is determined that the scrap rising interferes with the laser head 16.

The interference width corresponds to a width of the laser head 16 that is a size of the laser head 16 in a radial direction, and is related to a shape of the tip end portion of the laser head 16. FIG. 5(*a*) is a side view of the laser head 16, and FIG. 5(*b*) is a plan view of the laser head 16 seen from below. In the laser head 16 having such a shape as shown in FIG. 5, the interference width is a width L5/2 of the laser head 16. An interference width L5 is a distance via which the laser head 16 interferes with the scrap rising in the opening forming region.

Figure 6:
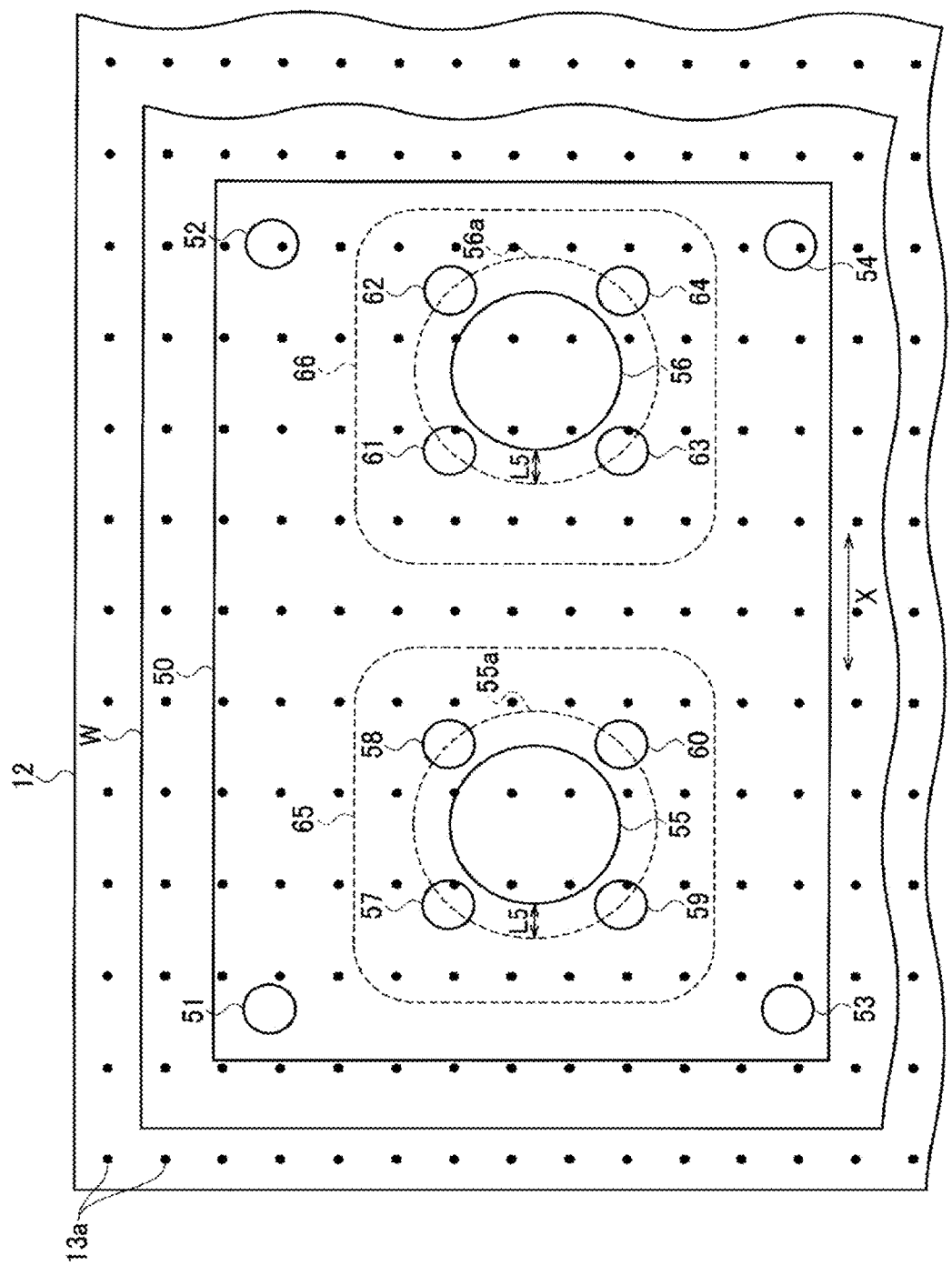
FIG. 6 is a plan view showing a state where an interference width is added to the first example shown in FIG. 2.

In the first example shown in FIG. 2, it is determined that in the opening forming regions 55 and 56, the scrap rising interferes with the laser head 16, and hence, as shown in FIG. 6, each of interference width added regions 55*a* and 56*a* is set in which the interference width L5 is added to an outer circumference of each of the opening forming regions 55 and 56.

The CAM equipment 30 determines, in step S304, whether or not there is an opening forming region interfering with the interference width added region. The CAM equipment 30 determines whether or not there is an opening forming region interfering with the interference width added region 55*a* or 56*a* shown in FIG. 6. The CAM equipment 30 determines that each of the opening forming regions 57 to 60 is an opening forming region interfering with the interference width added region 55*a*, and determines that each of the opening forming regions 61 to 64 is an opening forming region interfering with the interference width added region 56*a*.

Each of the opening forming regions 55 and 56 has a size (the second diameter L2) smaller than the maximum value X1 and larger than the minimum value X2, and there are the opening forming regions 57 to 60 or 61 to 64 that interfere with the interference width added region 55*a* or 56*a*. Therefore, it is determined that each of the opening forming regions 55 and 56 is the opening forming region where, in a case where the scrap rises, the scrap is to interfere with the laser head 16. It is determined, in a case where the opening forming region 55 or 56 that is the first opening forming region is processed and the scrap rises, that each of the opening forming regions 57 to 60 or 61 to 64 is a second opening forming region where the laser head 16 is moved to a position at which the laser head 16 interferes with the scrap rising.

The CAM equipment 30 determines, in step S304, that there is the opening forming region interfering with the interference width added region, and determines, in step S305, whether or not the interfering opening forming region is the opening forming region where the scrap is to rise.

The CAM equipment 30 determines the processing order of all the opening forming regions in step S306, in a case where it is determined in step S305 that the opening forming region interfering with the interference width added region is not the opening forming region where the scrap is to rise.

A method of determining the processing order of the opening forming regions will be described using the first example. As described above, in FIG. 6, it is determined that the opening forming regions interfering with the interference width added region 55*a* are the opening forming regions 57 to 60, and it is determined that the opening forming regions interfering with the interference width added region 56*a* are the opening forming regions 61 to 64. The opening forming region 55 and the opening forming regions 57 to 60 form a first interference region 65, and the opening forming region 56 and the opening forming regions 61 to 64 form a second interference region 66.

In this case, the CAM equipment 30 adopts a processing order in which the opening forming regions 51 to 54 located in regions other than the first and second interference regions are first processed. The CAM equipment 30 determines the processing order of the opening forming regions 51 to 54 in consideration of a moving distance of the laser head 16.

Specifically, the processing order is as follows. In a case where a standby position of the laser head 16 is an upper right position in FIG. 2, the processing order adopted by the CAM equipment 30 includes first processing the opening forming region 52 closest to the standby position of the laser head 16. The processing order adopted by the CAM equipment 30 includes then processing the opening forming region 54 closest to the opening forming region 52, subsequently processing the opening forming region 53 closest to the opening forming region 54, and finally processing the opening forming region 51 closest to the opening forming region 53.

Next, the CAM equipment 30 determines a processing order of processing the opening forming regions 55 and 57 to 60 of the first interference region 65 closest to the opening forming region 51, in the first interference region 65 and the second interference region 66.

The processing order adopted by the CAM equipment 30 includes first processing the opening forming regions 57 to 60, in the opening forming region 55 and the opening forming regions 57 to 60 interfering with the interference width added region 55*a*. The processing order adopted by the CAM equipment 30 includes processing the opening forming region 57 closest to the opening forming region 51, then processing the opening forming region 59 close to the opening forming region 57, next processing the opening forming region 60 closest to the opening forming region 59, and subsequently processing the opening forming region 58 closest to the opening forming region 60. The CAM equipment 30 may adopt a processing order in which the opening forming regions 57, 58, 60 and 59 are processed in this order. In the processing order adopted by the CAM equipment 30, the opening forming region 55 is processed last.

Thus, the CAM equipment 30 determines the processing order of processing the opening forming regions 57 to 60 interfering with the interference width added region 55*a*, prior to the opening forming region 55. Therefore, even when the opening forming region 55 is processed and the scrap rises, the laser head 16 does not interfere with the scrap rising.

Next, the CAM equipment 30 determines a processing order of processing the opening forming region 56 and the opening forming regions 61 to 64 in the second interference region 66. The processing order adopted by the CAM equipment 30 includes first processing the opening forming regions 61 to 64, in the opening forming region 56 and the opening forming regions 61 to 64. The processing order adopted by the CAM equipment 30 includes processing the opening forming region 61 closest to the opening forming region 58, then processing the opening forming region 63 close to the opening forming region 61, next processing the opening forming region 64 closest to the opening forming region 63, and subsequently processing the opening forming region 62 closest to the opening forming region 64. The CAM equipment 30 may adopt a processing order in which the opening forming regions 61, 62, 64, and 63 are processed in this order. In the processing order adopted by the CAM equipment 30, the opening forming region 56 is processed last.

Thus, the CAM equipment 30 determines the processing order of processing the opening forming regions 61 to 64 interfering with the interference width added region 56*a*, prior to the opening forming region 56. Therefore, even when the opening forming region 56 is processed and the scrap rises, the laser head 16 does not interfere with the scrap rising.

Returning to FIG. 4, in a case of determining, in step S305, that the opening forming region interfering with the interference width added region is the opening forming region where the scrap is to rise, the CAM equipment 30 forms a joint in one opening forming region in step S307.

Figure 7:
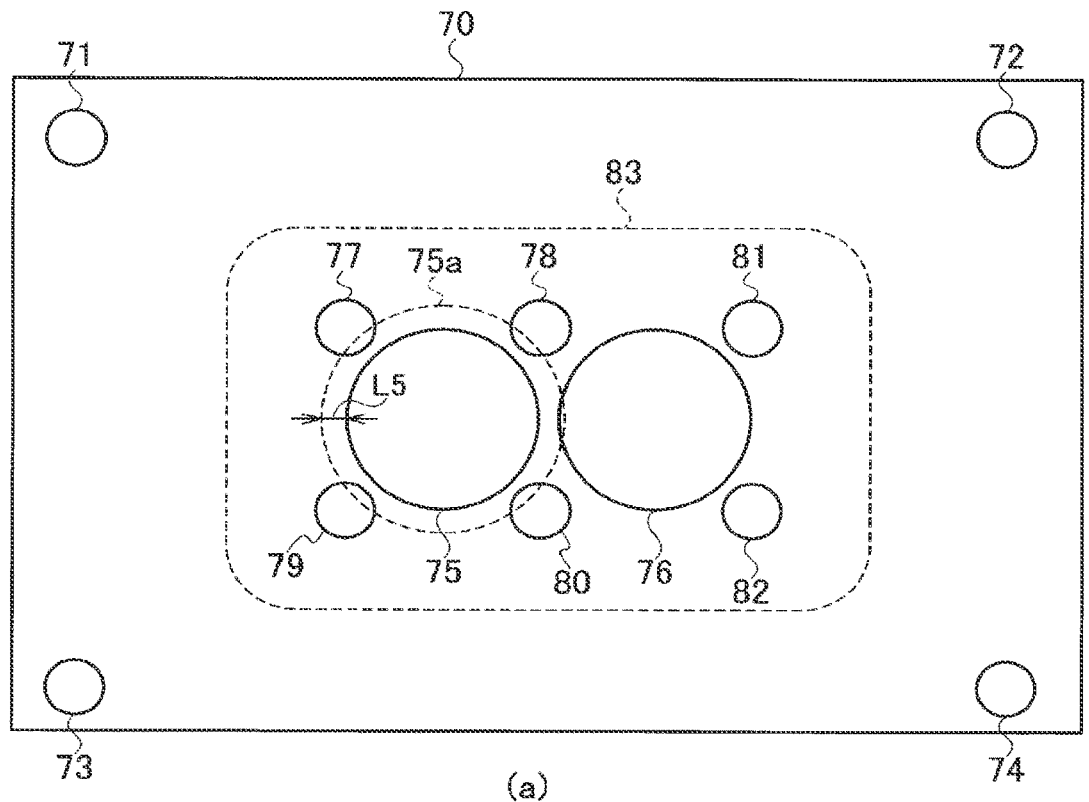
FIG. 7 is a plan view showing a second example in the case where the laser machining apparatus of the embodiment cuts out the plurality of parts from the sheet metal.
Figure 7:
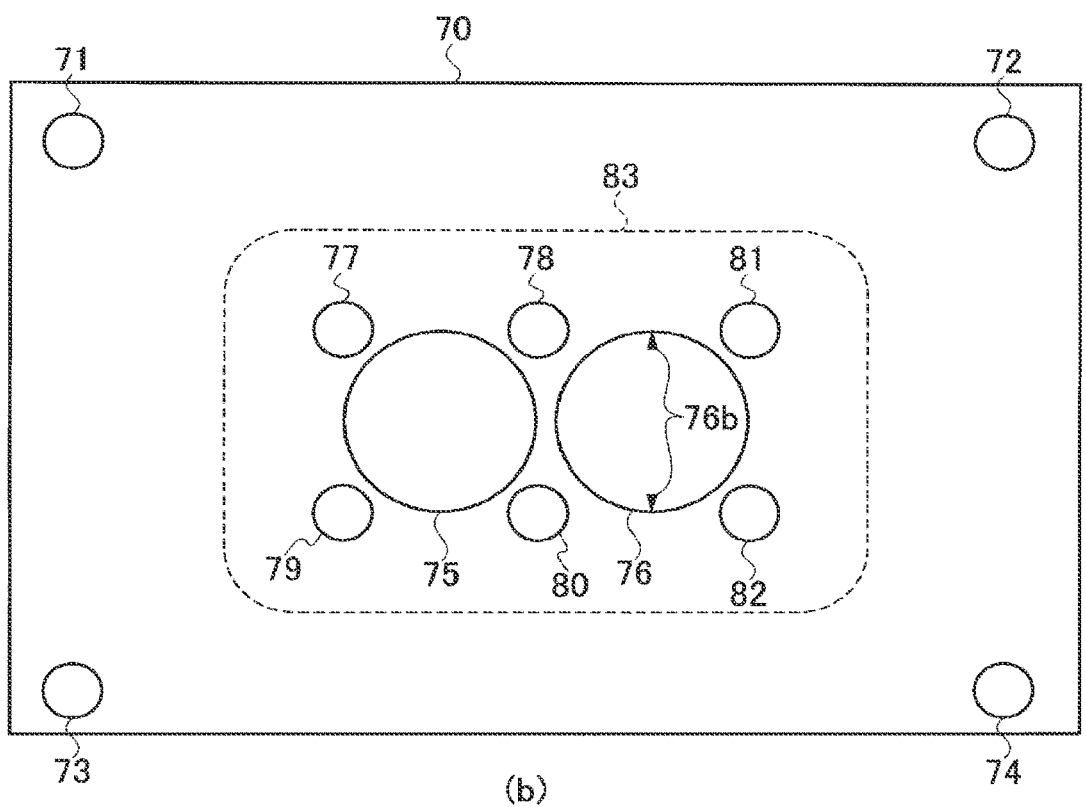

With reference to FIG. 7, description will be made as to a case where the opening forming region interfering with the interference width added region is the opening forming region where the scrap is to rise. FIG. 7(*a*) shows, as an example, a case of creating a processing program for cutting out a part 70 from the sheet metal W mounted on the table 12 (omitted from FIG. 7). In the part 70, opening forming regions 71 to 82 are set for forming circular openings.

As shown in FIG. 7(*a*), opening forming regions interfering with an interference width added region 75*a* are the opening forming regions 76 to 80, in which the opening forming region 76 is the opening forming region where the scrap is to rise. In this case, the CAM equipment 30 sets joints 76*b* in the opening forming region 76 as shown in FIG. 7(*b*). In a second example, two joints 76*b* are provided, and one or more joints may be provided.

Next, the equipment determines, in step S308, a processing order of all opening forming regions in a case where the joints are formed in one opening forming region.

A method of determining a processing order of opening forming regions will be described using the second example shown in FIG. 7. It is determined that opening forming regions interfering with the interference width added region 75*a* are the opening forming regions 76 to 80. In this case, the opening forming region 75 and the opening forming regions 77 to 82 form an interference region 83.

In this case, the CAM equipment 30 adopts a processing order in which the opening forming regions 71 to 74 located in regions other than the interference region 83 are first processed. The CAM equipment 30 determines the processing order of the opening forming regions 71 to 74 in consideration of the moving distance of the laser head 16.

Specifically, the processing order is as follows. In a case where the standby position of the laser head 16 is an upper right position in FIGS. 7(*a*) and (*b*), the processing order adopted by the CAM equipment 30 includes first processing the opening forming region 72 closest to the standby position of the laser head 16. The processing order adopted by the CAM equipment 30 includes then processing the opening forming region 74 closest to the opening forming region 72, subsequently processing the opening forming region 73 closest to the opening forming region 74, and finally processing the opening forming region 71 closest to the opening forming region 73.

Next, the CAM equipment 30 determines a processing order of processing the opening forming regions 75 and 76 and the opening forming regions 77 to 82 in the interference region 83.

The processing order adopted by the CAM equipment 30 includes first processing an opening forming region 76 side on which the joints 76*b* are formed. The processing order adopted by the CAM equipment 30 includes processing the opening forming region 81 farthest from the opening forming region 75, then processing the opening forming region 82 close to the opening forming region 81, and subsequently processing the opening forming region 76 with the joints closest to the opening forming region 82. In the processing order adopted by the CAM equipment 30, the processing starts from a region farthest from the opening forming region 75 determined as a region where the scrap interfering with the laser head 16 is to rise, to regions closer to the opening forming region 75.

The processing order adopted by the CAM equipment 30 includes first processing the opening forming regions 77 to 80, in the opening forming region 75 and the opening forming regions 77 to 80 interfering with the interference width added region 75*a*. The processing order adopted by the CAM equipment 30 includes processing the opening forming region 78 close to the opening forming region 76, then processing the opening forming region 80 close to the opening forming region 78, next processing the opening forming region 79 closest to the opening forming region 80, and subsequently processing the opening forming region 77 closest to the opening forming region 79. The CAM equipment 30 may adopt a processing order in which the opening forming regions 77, 78, 80, and 79 are processed in this order. In the processing order adopted by the CAM equipment 30, the opening forming region 75 is processed last.

Thus, the CAM equipment 30 determines the processing order of first processing the opening forming regions 77 to 80 interfering with the interference width added region 75*a*, prior to the opening forming region 75. Therefore, even when the opening forming region 75 is processed and the scrap rises, the laser head 16 does not interfere with the scrap rising. Furthermore, in a case where it is determined in step S301 that there is no opening forming region where the scrap generated after processing is to rise, it is determined in step S302 that there is no opening forming region where the scrap rising reaches and interferes with the laser head 16, and it is determined in step S304 that there is no opening forming region interfering with the interference width added region, the processing starts, in the processing order adopted by the CAM equipment 30, from a region with the shortest moving distance of the laser head 16 in order of proximity in step S309.

The laser machining apparatus 100 of the present embodiment cuts out the plurality of parts 50 or 70 from the sheet metal W based on the NC data created as described above, and hence the processing order does not have to be manually set. The scrap rising can be prevented from interfering with the laser head.

Figure 8:
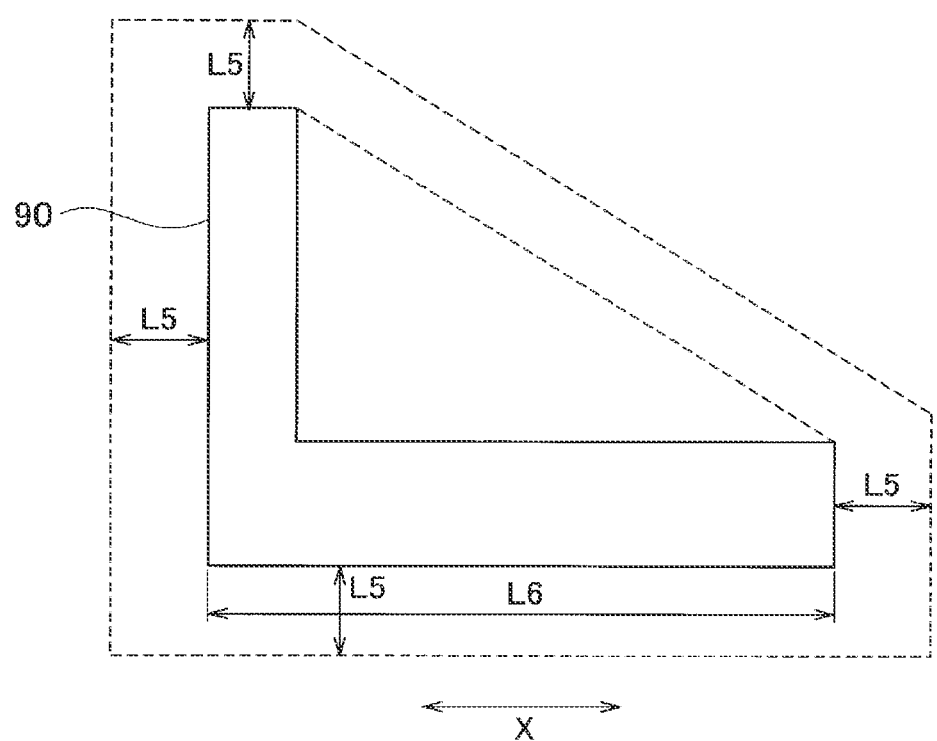
FIG. 8 is a plan view showing an example of an interference width to be set when the laser machining apparatus of the embodiment cuts out noncircular parts from a sheet metal.

The present invention is not limited to the present embodiment described above, and can be variously changed without departing from the summary of the present invention. In the above described embodiment, the processing of the circular opening forming region has been described, but the present invention is applicable also to an L-shaped opening forming region 90 as shown in FIG. 8. Here, a length of the L-shaped opening forming region 90 in an X-direction is denoted with L6, and it is determined whether or not the length L6 is smaller than a predetermined maximum value and larger than a predetermined minimum value. In a case where the length of the opening forming region 90 is smaller than the predetermined maximum value and larger than the predetermined minimum value, it is determined that the opening forming region 90 is an opening forming region where the scrap interfering with the laser head 16 is to rise. It is determined whether or not there is another opening forming region interfering with an interference width added region where a predetermined interference width L5 is added to the opening forming region 90. In a case where there is the other opening forming region interfering with the interference width added region, the CAM equipment 30 adopts a processing order of first processing the other opening forming region, prior to processing of the opening forming region 90.

INDUSTRIAL APPLICABILITY

According to a laser machining apparatus, a laser machining method, and a processing program creation device of the present invention, a processing order does not have to be manually set, and a scrap rising can be prevented from interfering with a laser head.

The invention claimed is:
1. A laser machining apparatus comprising:
a machining apparatus main body including a table on which a plurality of skids are arranged, and configured to irradiate a material mounted on the skids with a laser beam from a laser head and cut the material; and
a control device configured to control the machining apparatus main body to cut around an opening forming region set in the material and form an opening, wherein
the control device:
determines that the opening forming region where a scrap rising after processing is to be formed in a plurality of scraps formed by cutting around the opening forming region is a first opening forming region,
determines, in a case where the first opening forming region is processed and the scrap rises, whether or not the opening forming region is an opening forming region where the scrap rising reaches and interferes with the laser head and adds a predetermined interference width to an outer circumference of the opening forming region where the scrap rising is determined to interfere with the laser head, and
determines that the opening forming region where the laser head is moved to a position at which the laser head interferes with the scrap rising is a second opening forming region, and controls the machining apparatus main body to perform processing in such a processing order that the second opening forming region is processed prior to the processing of the first opening forming region.

2. A laser machining method in a laser machining apparatus including a table on which a plurality of skids are arranged, and configured to irradiate a material mounted on the skids with a laser beam from a laser head and cut the material, the laser machining method comprising:

determining that an opening forming region where a scrap rising after processing is to be formed in a plurality of scraps formed by cutting around the opening forming region set in the material is a first opening forming region;

determining whether or not the opening forming region is an opening forming region where the scrap rising reaches and interferes with the laser head and adding a predetermined interference width to an outer circumference of the opening forming region where the scrap rising is determined to interfere with the laser head;

determining, in a case where the first opening forming region is processed and the scrap rises, that the opening forming region where the laser head is moved to a position at which the laser head interferes with the scrap rising is a second opening forming region;

in a case where the scrap of the opening forming region interfering with the interference width added region is determined not to rise, adopting such a processing order that the second opening forming region is processed prior to the processing of the first opening forming region; and in a case where the scrap of the opening forming region interfering with the interference width added region is determined to rise, forming a joint in the opening forming region.

3. A non-transitory computer readable medium having a processing program stored thereon, the processing program, when executed by the control device of the laser machining apparatus of claim 1, configured to:

in a case where the laser machining apparatus cuts around an opening forming region set in a material mounted on a table on which a plurality of skids are arranged to form an opening, determining that the opening forming region where a scrap rising after processing is to be formed in a plurality of scraps formed by cutting around the opening forming region is a first opening forming region;

determining whether or not the opening forming region is an opening forming region where the scrap rising reaches and interferes with a laser head and adding a predetermined interference width to an outer circumference of the opening forming region where the scrap rising is determined to interfere with the laser head;

determining, in a case where the laser machining apparatus processes the first opening forming region and the scrap rises, that the opening forming region where the laser head of the laser machining apparatus is moved to a position at which the laser head interferes with the scrap rising is a second opening forming region;

in a case where the scrap of the opening forming region interfering with the interference width added is determined not to rise, adopting such a processing order that the second opening forming region is processed prior to the processing of the first opening forming region; and in a case where the scrap of the opening forming region interfering with the interference width added region is determined to rise, forming a joint in the opening forming region.

4. The pro non-transitory computer readable medium according to claim 3, wherein the processing program creation device creates a processing program comprising determining, in a case where a size of the opening forming region in a predetermined direction is smaller than a predetermined maximum value, that the opening forming region is the first opening forming region.

5. The non-transitory computer readable medium according to claim 4, wherein the processing program creation device creates a processing program comprising determining, in a case where the size of the opening forming region in the predetermined direction is smaller than the predetermined maximum value and larger than a predetermined minimum value, that the opening forming region is an opening forming region where a scrap interfering with the laser head is to be formed.

6. The non-transitory computer readable medium according to claim 5, wherein the processing program creation device creates a processing program comprising:

setting an interference width added region where a predetermined interference width is added to the opening forming region where the size of the opening forming region in the predetermined direction is smaller than the predetermined maximum value and larger than the predetermined minimum value; and determining that an opening forming region interfering with the interference width added region is the second opening forming region.

7. The non-transitory computer readable medium according to claim 6, wherein the predetermined maximum value is set to a value at which a scrap generated when the opening forming region is processed does not drop down from the skids, and is stably mounted on the skids, and the predetermined minimum value is set to a value at which, even in a case where the scrap generated by the processing of the opening forming region rises, the scrap rising does not interfere with the laser head.

* * * * *